United States Patent
Shimizu

[15] 3,661,339
[45] May 9, 1972

[54] FILM REWINDING MECHANISM FOR CAMERAS

[72] Inventor: Terushige Shimizu, Tokyo, Japan
[73] Assignee: Nippon Kogaku K.K., Tokyo, Japan
[22] Filed: Mar. 17, 1970
[21] Appl. No.: 20,327

[30] Foreign Application Priority Data
Mar. 27, 1969 Japan.................................44/26698

[52] U.S. Cl.............................242/71.6, 74/405, 74/435, 95/11 UW, 95/31 R
[51] Int. Cl........................................................G03p 1/04
[58] Field of Search..............242/71.6; 95/11 W, 31 R, 34 R; 74/435, 405

[56] References Cited
FOREIGN PATENTS OR APPLICATIONS
237,441 8/1925 Great Britain..........................74/435

Primary Examiner—Samuel S. Matthews
Assistant Examiner—Russell E. Adams, Jr.
Attorney—Ward, McElhannon, Brooks & Fitzpatrick

[57] ABSTRACT

A film rewinding mechanism for underwater cameras comprises a rewinding shaft adapted to engage film rewind gearing for film rewinding and to disengage from the gearing during film advancement. The shaft is provided with two coaxial gears having areas formed without teeth. During film advancement, the areas without teeth are in alignment to disengage the shaft from the rewind gearing; and during rewinding, the areas without teeth are out of alignment to form a continuous toothed gear in engagement with the rewind gearing.

5 Claims, 4 Drawing Figures 3,661,339

FILM REWINDING MECHANISM FOR CAMERAS

BACKGROUND OF THE INVENTION

The present invention relates generally to a camera and more particularly a film rewinding mechanism for underwater cameras.

An O-ring is generally used as a sealing member over a rewinding shaft of an underwater camera so that the film winding operation requires much force because of the friction between the O-ring and the rewinding shaft. In order to eliminate this disadvantage, there has been proposed a clutch mechanism by which the film can be rewound by lifting the rewinding knob and rotating it, but this mechanism is complicated in operation because of the clutch operation—and its operation being different from the ordinary camera,—operational errors tend to occur.

SUMMARY OF THE INVENTION

In view of the above, the object of the present invention is to provide a film rewinding mechanism in which operational complexity and errors are avoided because the rewinding mechanism can be operated in the same manner as the ordinary camera, and the excess force necessary for winding the film which is caused by the friction between an O-ring and a rewinding shaft in the operation of film winding is eliminated.

In brief, the present invention provides an improved film rewinding mechanism for cameras in which a first gear which is adapted to rotate in unison with a rewinding knob and has a disengaging portion, i.e. a portion formed without teeth, is rotatably disposed in coaxial relation with a second gear having also a disengaging or no tooth portion, one of the gears being provided with a pin while the other gear is provided with a slot in such a manner that the pin is fitted into said slot, both of said gears being meshed with an intermediate gear which is operatively coupled to a shaft which rotates a shaft of a film cartridge, when the film is rewound, the pin and slot cooperating so that both of the gears may constitute one complete gear having no disengaging or no tooth portion whereby the continuous rotation of the rewinding knob alone can be transmitted to the intermediate gear; and when the film is advanced or wound, the disengaging or no tooth portions of said gears come to the position where said gears are to be meshed with (or not be be meshed with) the intermediate gear, so that the rotation cannot be transmitted to the rewinding knob.

The film rewinding mechanism in accordance with the present invention eliminates the excessive force required to overcome the frictional force produced between an O-ring and a rewinding shaft in the conventional mechanism. The film rewinding mechanism can be operated in the same manner as the ordinary camera so that error of operation can be positively prevented. The film rewinding mechanism can also ensure smooth film rewinding operation.

The above and other objects, features and advantages of the present invention will become more apparent from the following description of one illustrative embodiment thereof taken in conjunction with the accompanying drawing.

DESCRIPTION OF THE PREFERRED EMBODIMENT

Figure 1:
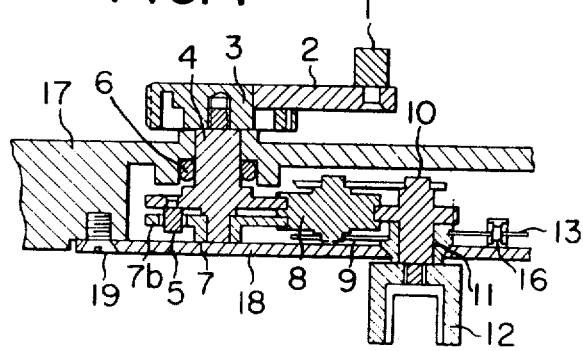
FIG. 1 is a sectional view of one embodiment of the present invention.
Figure 2:
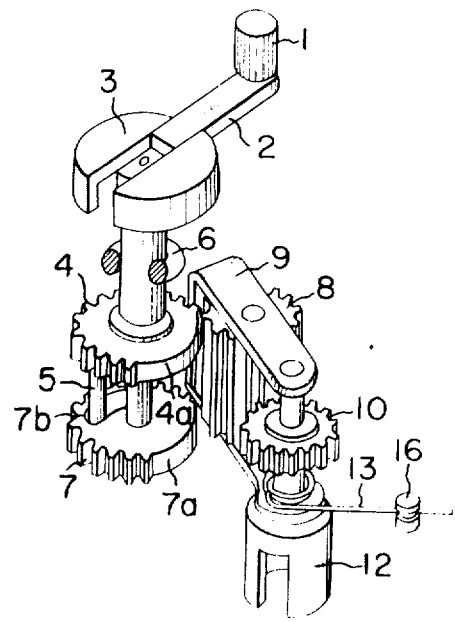
FIG. 2 is a perspective view thereof.

Referring to FIGS. 1 and 2, reference numeral 1 designates a rewind crank knob; 2, a rewind crank; 3, a rewind knob; and 4, a gear which is made integral with a shaft which is screwed in the rewind knob 3, and provided with a disengaging portion 4a which is an arcuate portion of the gear 4 having no teeth. A pin 5 extending from the gear 4 is fitted into an arcuate slot 7b formed in a gear 7 which is rotatably disposed on the shaft of the gear 4 and coaxial therewith and has a disengaging portion 7a which is a portion of the gear 7 having no tooth as in the case of the gear 4. The pitch and pitch circle of the tooth of the gear 4 is the same as the gear 7. An O-ring 6 is interposed and seals between the shaft of the gear 4 and an upper part of a camera body to be described hereinafter. An intermediate gear 8 is journalled by a U-shaped member 9 which is carried by a shaft of a rewinding gear 10. The intermediate gear 8 is in mesh with the gears 4 and 7 so as to rotate the rewinding gear 10. A bearing 11 for the rewinding gear 10 is fixed to a plate member 18. The rewinding gear 10 is made in unitary construction with a rewinding gear shaft 12 which is connectable with a film spool (not shown) and is journalled by the bearing 11. The U-shaped member 9 is normally biased by means of a spring 13 so as to rotate in the counterclockwise direction.

Figure 3:
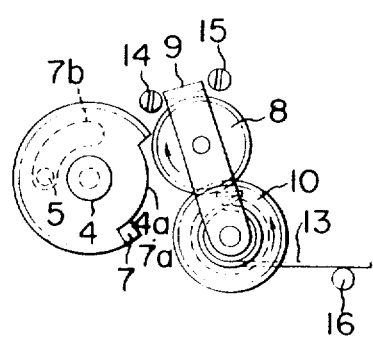
FIG. 3 is a plan view illustrating the gear portion thereof and the relative positions of gears when the film is advanced or wound.
Figure 4:
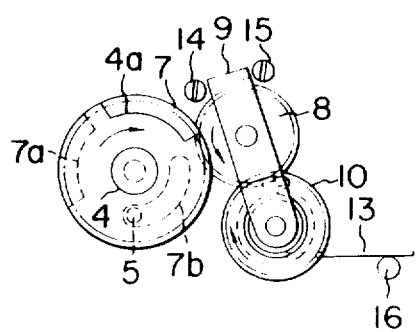
FIG. 4 is a view similar to FIG. 3 but illustrating their positions when the film is rewound.

Next referring to FIGS. 3 and 4, a pin 14 serves to adjust the stop position of the U-shaped member 9 and a pin 15 is so positioned as to provide a small spacing between the pin 15 and the U-shaped member 9. Both of the pins 14 and 15 are fixed to the plate member 18. The free end of the spring 13 is stopped by a pin 16 extending from the plate member 18.

Referring back to FIG. 1, the plate member 18 is fixed to the upper part of the camera body 17 by means of a setscrew 19.

Next, the mode of operation will be described hereinafter. When the film is advanced, the rewinding gear shaft 12 is caused to rotate in the direction indicated by the arrow in FIG. 3 by the rotation of a film spool so that the gears 4 and 7 are rotated through the intermediate gear 8. When the disengaging portions 4a and 7a of the gears 4 and 7 come to the position where said gears are not to be meshed with the intermediate gear 8, no rotation is transmitted to the knob 3 through the gears 4 and 7 and only the rewinding gear 10 and this intermediate gear 8 are rotated. Therefore, the film advancement operation is disconnected from the rewinding knob shaft.

To rewind the film, the rewinding knob 3 is rotated through the rewinding crank knob 1 and the rewinding crank 2 so that the gear 4 is rotated in the direction indicated by the arrow in FIG. 4 while the gear 7 remains stationary. When the disengaging portion 4a rotates past the intermediate gear 8, the teeth of the gear 4 engage with intermediate gear 8 so that the rotation of gear 4 is transmitted to the rewinding gear 10 whereby the film is rewound. Then the pin 5 engages with the end of the arcuate slot 7b of the gear 7 so that, the latter is also caused to rotate and engage with the intermediate gear 8. The disengaging portion 4a of the gear 4 and the disengaging portion 7a of the gear 7 are stopped by the pin 5 in such a relative position that the disengaging portions are not superposed. This means that, in effect, one gear having teeth formed around the whole periphery thereof is formed by the pair of gears 4 and 7 so that the rotation can be always transmitted to the rewinding gear 10 whereby film rewinding can be effected smoothly. The film rewinding operation of the device of the present invention is not different from that of the conventional camera.

The present invention has been so far described with particular reference to one illustrative embodiment thereof, but it will be understood that variations and modifications can be effected without departing from the true spirit of the present invention as described hereinabove and as defined in the appended claim.

What is claimed is:

1. In a camera having a housing and a film supply spool rotatably mounted therein; an improved film rewinding device which comprises:

an operation member rotatably mounted in said housing;

a shaft rotatable within said housing and engaging said supply spool to cause rotation thereof; and means for selectively coupling said operation member and said shaft, said coupling means including a gear train interconnected to said shaft, a first wheel fixed to said operation member having a toothed portion engageable with said gear train, and a toothless portion, a second wheel arranged coaxially with and rotatable relative to said first wheel and having a toothed portion engageable with said gear train and a toothless portion, and means for limiting the relative rotation between said wheels to selectively locate said wheels at a disconnecting position in which both the toothless portions are opposed to said gear train, and at a connecting position in which at least one of said toothed portions is opposed to and in engagement with said gear train whereby upon rotation of said film spool in film advancement said toothless portions are opposed to said gear train to disconnect said operation member therefrom and upon rotation of said operation member in film rewinding direction, at least one of said toothed portions engages said gear train to operatively connect said operation member to said shaft.

2. A film rewinding device according to claim 1, wherein said limitation means comprises a pin provided on said first wheel and a limited slot provided on said second wheel adapted to receive said pin.

3. A film rewinding device according to claim 1, wherein said gear train comprises a toothed wheel fixed to said shaft and an intermediate toothed wheel mounted to said camera housing for rocking movement and engageable with said wheel and said first and second wheels, and the film rewinding device further comprises a stopper for controlling the engaging position of said intermediate wheel relative to said first and second wheels, and an biasing member for urging said intermediate wheel to its engaging position.

4. A film rewinding device according to claim 1, wherein said operating member extends outside of said camera housing for manual operation.

5. A film rewinding device according to claim 4, which further comprises a shield member mounted between said operating member and said camera housing for preventing a fluid from entering said camera housing by close contact action of the deformation of the shield member.

* * * * *